United States Patent
Challender

(10) Patent No.: US 6,854,486 B2
(45) Date of Patent: Feb. 15, 2005

(54) FLUID LINE ASSEMBLY

(75) Inventor: Gary B. Challender, Grass Lake, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/431,856

(22) Filed: May 8, 2003

(65) Prior Publication Data

US 2003/0217778 A1 Nov. 27, 2003

Related U.S. Application Data

(60) Provisional application No. 60/379,942, filed on May 13, 2002.

(51) Int. Cl.[7] .............................. F16L 27/04; F16L 27/12
(52) U.S. Cl. .................. 138/109; 138/114; 138/155; 138/120; 285/123.1; 285/121.2; 285/121.7
(58) Field of Search ................................ 138/109, 114, 138/155, 120; 285/123.17, 123.15, 123.1, 121.2, 121.6, 121.7, 143.1, 145.3

(56) References Cited

U.S. PATENT DOCUMENTS

| | | | |
|---|---|---|---|
| 2,616,728 A | 11/1952 | Pitt | 138/121 X |
| 3,306,636 A * | 2/1967 | Hereth | 285/94 |
| 4,059,288 A * | 11/1977 | Mohr | 285/2 |
| 4,437,688 A * | 3/1984 | Kramer et al. | 285/95 |
| 4,561,679 A * | 12/1985 | Choate | 285/95 |
| 4,688,827 A * | 8/1987 | Bassett | 285/2 |
| 4,776,617 A * | 10/1988 | Sato | 285/145.3 |
| 5,069,488 A * | 12/1991 | Freyer et al. | 285/302 |
| 5,660,241 A * | 8/1997 | Leising et al. | 175/321 |
| 5,873,544 A | 2/1999 | Pike et al. | 244/14 |
| 5,897,146 A * | 4/1999 | Saito et al. | 285/145.3 |
| 6,056,329 A * | 5/2000 | Kitani et al. | 285/145.3 |
| 6,305,426 B1 * | 10/2001 | Sato et al. | 138/120 |
| 6,425,443 B1 * | 7/2002 | Hill et al. | 166/377 |

FOREIGN PATENT DOCUMENTS

| | | | | |
|---|---|---|---|---|
| EP | 0 051 201 | * | 10/1981 | F16L/37/22 |
| GB | 152091 | | 10/1920 | |
| GB | 1244928 | | 9/1971 | |
| GB | 1265791 | | 3/1972 | |
| GB | 2009872 A | * | 6/1979 | F16L/55/04 |

* cited by examiner

Primary Examiner—Patrick Brinson
(74) Attorney, Agent, or Firm—Honigman Miller Schwartz and Cohn LLP

(57) ABSTRACT

A fluid line assembly is disclosed that includes an outer fluid line and an inner fluid line disposed substantially within the outer fluid line. The inner and outer fluid lines each include a slip joint. In an embodiment of the invention, at least one of the slip joints includes a reservoir in communication with the interior of the corresponding fluid line. Among other things, the reservoir is suitable for receiving fluid from the corresponding fluid line as the fluid line assembly is contracted and expelling fluid into the corresponding fluid line as the fluid line assembly is extended. In another embodiment of the invention, the inner and outer fluid lines include a ball joint assembly.

18 Claims, 2 Drawing Sheets

FLUID LINE ASSEMBLY

REFERENCE TO RELATED APPLICATIONS

This application claims the benefit of U.S. Provisional Application No. 60/379,942 filed May 13, 2002, which is incorporated by reference herein in its entirety.

BACKGROUND OF THE INVENTION

1. Field of the Invention

The present invention relates generally to fluid transfer devices and more particularly to a shrouded fluid line assembly.

2. Description of the Related Art

Many industrial, automotive and aerospace applications require the transfer of fluid between two components. For example, in certain aircraft it is common to transfer fuel between two spaced apart fuel tanks or between a fuel pump and a fuel tank. Flexible hoses and rigid pipes have generally been used to convey fluid from one component to another. While flexible hoses can be easily routed and also tolerate movement and vibration better than rigid pipes, flexible hoses are generally more expensive and incapable of conveying fluid at the pressures a rigid pipe of comparable diameter can convey. Additionally, flexible hoses generally exhibit a minimum bend radius and are not capable of more than a minimal amount of twist once installed. Moreover, both flexible hoses and rigid pipes can leak, which is intolerable in certain applications. For these and other reasons, it is desirable to provide an improved means for conveying fluid between two components.

SUMMARY OF THE INVENTION

A fluid line assembly is disclosed that includes an outer fluid line and an inner fluid line disposed substantially within the outer fluid line. The inner and outer fluid lines each include a slip joint. In an embodiment of the invention, at least one of the slip joints includes a reservoir in communication with the interior of the corresponding fluid line. Among other things, the reservoir is suitable for receiving fluid from the corresponding fluid line as the fluid line assembly is contracted and expelling fluid into the corresponding fluid line as the fluid line assembly is extended. In another embodiment of the invention, the inner and outer fluid lines include a ball joint assembly.

BRIEF DESCRIPTION OF THE DRAWINGS

FIG. 1 is a partial cross-sectional view of a fluid line assembly according to an embodiment of the invention.

FIG. 2 is an enlarged cross-sectional view of a ball joint according to an embodiment of the invention.

FIG. 3 is a partial cross-sectional view of a fluid line assembly according to another embodiment of the invention.

FIG. 4 is a partial cross-sectional view of a fluid line assembly according to another embodiment of the invention.

DETAILED DESCRIPTION

Referring now to the drawings, the preferred illustrative embodiments of the present invention are shown in detail. Although the drawings represent the some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise configurations shown in the drawings and disclosed in the following detailed description.

A shrouded fluid line assembly 20 according to an embodiment of the invention is shown in FIG. 1. Fluid line assembly 20 includes an inner fluid line 22 and an outer fluid line or shroud 24. Inner fluid line 22 functions as the primary fluid containment member, whereas shroud 24 functions as a secondary fluid containment member to prevent fluid leakage into the surrounding environment should inner fluid line 22 fail.

Fluid line assembly 20 extends from a first end 26 to a second end 28. Each end 26, 28 includes a means for attaching fluid line assembly 20 to another structure, such as a fuel tank. In an embodiment, each end 26, 28 includes a flange 30 having a groove 32 for receipt of an o-ring or other flexible sealing member (not shown). Each flange 30 is configured to be secured to the mating structure, such as by bolting or welding flange 30 to the mating structure. Optionally, one or both of ends 26, 28 may be provided with a protrusion 34 for insertion into a port (not shown) in the mating structure, as is known in the art. Protrusion 34 may include an annular sealing member 35, such as an o-ring, to seal against the port of the mating structure. It will be appreciated that the means used to secure fluid line assembly 20 to mating structures is not limited to flanges 30 or protrusion 34, and that other suitable means known in the art for securing fluid line assembly 20 to mating structures, such as a threaded connection, are within the scope of this invention.

Fluid line assembly 20 is generally characterized as a double ball joint design, meaning that a portion of fluid line assembly 20 may pivot and rotate relative to another portion of the fluid line assembly. In an embodiment of the invention, fluid line assembly 20 includes a double ball joint assembly 36 proximate first end 26. A first or inner ball joint 38 includes a socket portion 40 and a ball portion 42. Socket portion 40 may be integrally formed with an inner housing 44 that includes flange 30 and protrusion 34. A second or outer ball joint 46 includes a socket portion 48 and a ball portion 50. Socket portion 48 may be integrally formed with an outer housing 52 that is secured to inner housing 44 by a resilient locking ring 54, such as a snap ring or retaining ring. An annular sealing member 56, such as an o-ring, may be provided between inner housing 44 and outer housing 52 to inhibit fluid leakage therebetween. It will be appreciated that outer housing 52 may be secured to inner housing 44 using threads or other suitable connecting means in combination with or in place of resilient locking ring 54.

Inner ball joint 38 is substantially similar to outer ball joint 46, with exception to the relative size of the ball joints; therefore, only outer ball joint 46 will be described in detail. Referring to the embodiment ball joint 46 illustrated in FIG. 2, ball portion 50 includes a generally rounded or bulbous surface 58 and a shoulder 60 that extends outward from rounded surface 58. Shoulder 60 is spaced apart axially from a corresponding shoulder 62 in socket portion 48. Ball portion 50 is rotatable in socket portion 48 until shoulder 60 on ball portion 50 contacts shoulder 62. An annular sealing element 64, such as an o-ring, is provided within a groove in socket portion 48 for sealing engagement with rounded surface 58 of ball portion 50. A locking ring 66, or other suitable connecting means provided between ball portion 50 and socket portion 48, is used to retain a bearing member 67 within socket member 48. Bearing member 67 is used to facilitate rotation of ball portion 50 within socket portion 48 and to inhibit removal of ball portion 50 from socket portion 48 after assembly.

Figure 1:
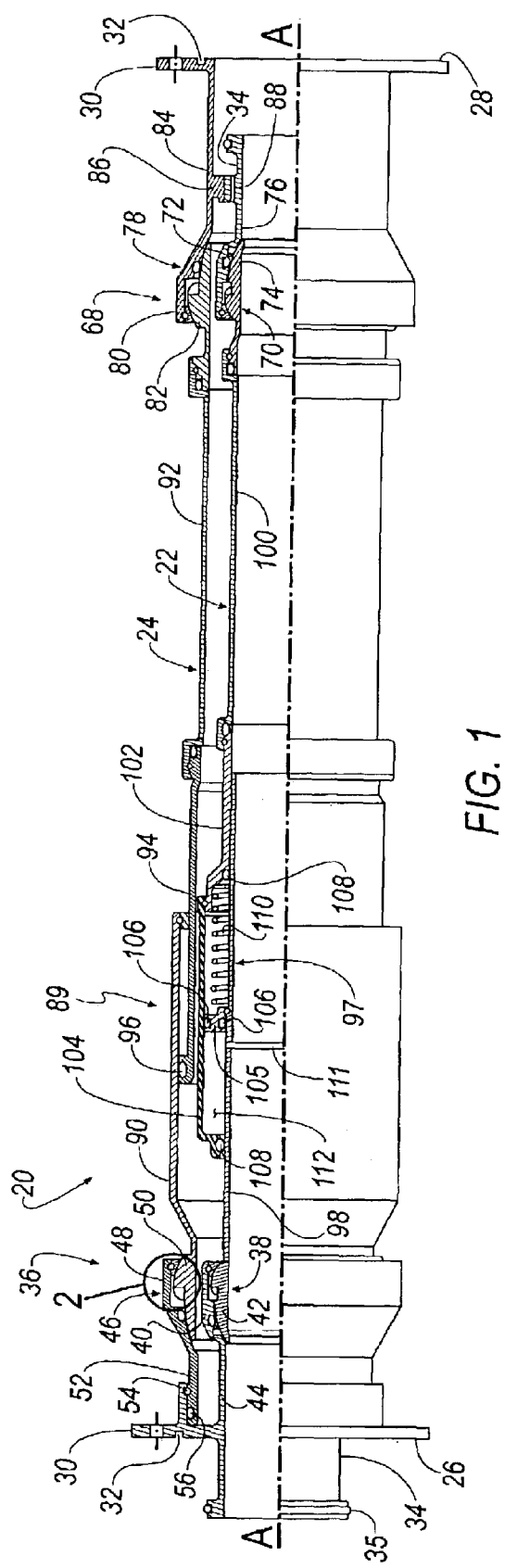
Figure 2:
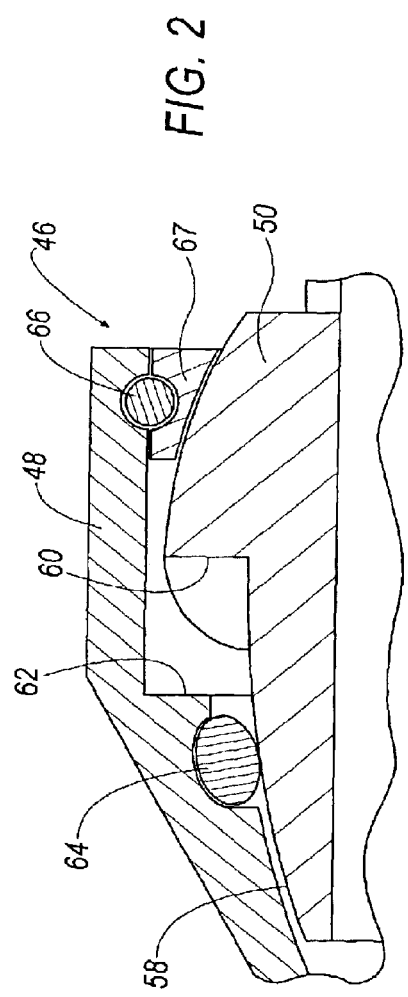

Second end 28 of fluid line assembly 20 is also provided with a double ball joint assembly 68 that is substantially similar in structure and function to double ball joint assembly 36. A first or inner ball joint 70 includes a socket portion 72 and a ball portion 74. Socket portion 72 may be integrally formed with an inner housing 76 that includes a protrusion 34, as described above. A second or outer ball joint 78 includes a socket portion 80 and a ball portion 82. Socket portion 80 may be integrally formed with an outer housing 84 that includes flange 30. Outer housing 84 may also include a first threaded protrusion 86 that extends radially inwardly toward inner housing 76. Similarly, inner housing 76 may include a second threaded protrusion 88 that extends radially outwardly toward outer housing 84. During assembly, second threaded protrusion 88 is threaded onto first threaded protrusion 86 to secure inner fluid line 22 to outer fluid line 24. The threaded interface between inner and outer fluid lines 22, 24 may also be configured to inhibit fluid leakage therebetween.

In an embodiment of the invention, outer fluid line 24 also includes a slip joint 89. As illustrated in FIG. 1, outer fluid line 24 includes a first outer tube section 90 that may be integrally formed with ball member 50, a second outer tube section 92 sealably joined with ball portion 82, and a slip joint section 94 that cooperates with first outer tube section 90 to form outer slip joint 89. Slip joint section 94 is sealably joined to second outer tube section 92 on one end and on the other end includes an annular sealing member 96, such as an o-ring, to inhibit fluid leakage at the outer slip joint 89. It will be appreciated that more than one outer tube section 92 may be used to extend the length of outer fluid line 24. Alternatively, it will also be appreciated that slip joint section 94 may be sealably joined with ball member 82, eliminating second outer tube section 92.

Inner fluid line 22 also includes an inner slip joint 97. As illustrated in FIG. 1, inner fluid line 22 includes a first inner tube section 98 that may be integrally formed with ball member 42, a second inner tube section 100 sealably joined with ball member 74, and a pair of slip joint sections 102 and 104 that cooperate with first inner tube section 98 to form inner slip joint 97. First slip joint section 102 is sealably joined to second inner tube section 100. Second slip joint section 104 is joined to first slip joint section 102 to create a void between first inner tube section 98 and second slip joint section 104.

A divider 105, which is secured to first inner tube section 98, includes a pair of annular sealing members 106, such as o-rings, that seal against first inner tube section 98 and second slip joint section 104. First and second slip joint sections 102 and 104 include an annular sealing member 108, which seal against first inner tube section 98. A resiliently compressible member 110, such as a compression or wave spring, extends axially between divider 105 and first slip joint section 102. Resiliently compressible member 110 is made of a conductive material, which permits an electrical charge to be transferred between first slip joint section 102 and first inner tube section 98.

Outer tube section 90 and slip joint section 94 are moveable relative to each other substantially along an axis A—A in FIG. 1. Similarly, inner tube section 98 and slip joint sections 102, 104 are moveable relative to each other substantially along axis A—A. Thus, inner and outer slip joints 89, 97 permit fluid line assembly 20 to be axially extended and contracted, as required. These and other features facilitate installation of fluid line assembly 20 between two components and allow for movement of the mating components without adversely affecting the sealing performance of the fluid line assembly.

In an embodiment, inner slip joint 97 includes a reservoir 112 that is defined by divider 105, second slip joint section 104 and first inner tube section 98. Reservoir 112 functions as an accumulator for excess fluid contained in inner fluid line 22 when fluid line assembly 20 is contracted. At least one hole 111 is disposed through first inner tube section 98 to allow fluid to enter reservoir 112. Allowing an incompressible fluid, such as fuel, to flow into the expanding reservoir 112 dissipates the shock or stress on inner fluid line 22 as it is contracted. Similarly, during extension of fluid line assembly 20, fluid contained in reservoir 112 is free to flow back into inner fluid line 22 through holes 111 as the volume of reservoir 112 decreases.

The inner slip joint 97 is also pressure balanced. As will be appreciated, an increase in fluid pressure within inner fluid line 22 and reservoir 112 will tend to act to expand the volume of reservoir 112 creating a contracting force in fluid line assembly 20. Expansion forces within reservoir 112, and the corresponding contracting forces created in fluid line assembly 20, act to resist expansion of inner fluid line 22 due to the increase in fluid pressure.

Figure 3:
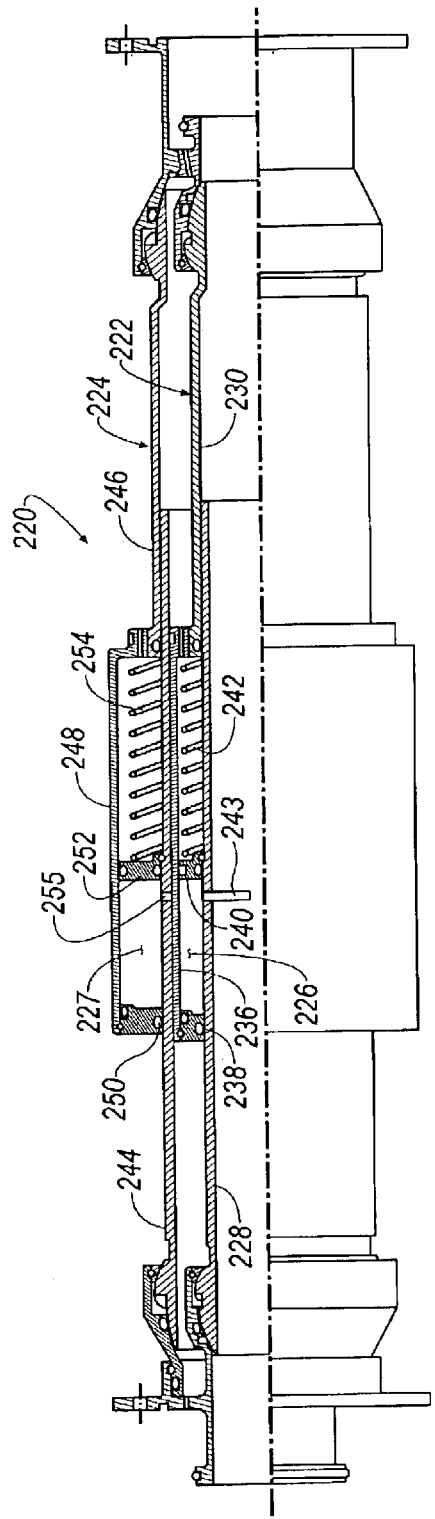

Referring to FIG. 3, another embodiment of the invention is shown. In this embodiment, a fluid line assembly 220 is disclosed that is substantially similar to fluid line assembly 20 with at least one exception, namely, both the inner fluid line 222 and the outer fluid line or shroud 224 include a slip joint having a pressure balanced reservoir 226 and 227, respectively.

As illustrated in FIG. 3, inner fluid line 222 includes a first inner tube section 228 and a second inner tube section 230. An inner slip joint section 236 is sealably joined on one end to second inner tube section 230 and is free to slide over first inner tube section 228 on the other end. An annular sealing member 238, such as an o-ring, is disposed between first inner tube section 228 and inner slip joint section 236 to inhibit the passage of fluid therebetween. A divider 240, which is substantially similar to divider 105 described above, is provided between first inner tube section 228 and inner slip joint section 236 and helps defines reservoir 226. A resiliently compressible member 242, such as a compression or wave spring, extends axially between divider 240 and second inner tube section 230 and also provides conductivity between first inner tube section 228 and second inner tube section 230. At least one hole 243 is disposed through first inner tube section 228 to provide communication between the interior of inner fluid line 222 and reservoir 226.

As in inner slip joint 97, reservoir 226 acts as an accumulator when fluid line assembly 220 is contracted. The inner slip joint is also pressure balanced. As described above, an increase in fluid pressure within inner fluid line 222 and reservoir 226 will act to expand the volume of reservoir 226 creating a contracting force in fluid line assembly 220. Expansion forces within reservoir 226, and the corresponding contracting forces created in fluid line assembly 220, act to resist expansion of inner fluid line 222 due to the increase in fluid pressure.

Referring still to FIG. 3, outer fluid line 224 includes a first outer tube section 244 and a second outer tube section 246. An outer slip joint section 248 is sealably joined on one end to second outer tube section 246 and is free to slide over first outer tube section 244 on the other end. An annular sealing member 250 is disposed between first outer tube section 244 and outer slip joint section 248 to substantially prevent leakage of fluid therebetween. A divider 252, which is substantially similar to divider 105 described above, is secured to first outer tube section and is provided between first outer tube section 244 and outer slip joint section 248 to help define reservoir 227. A resiliently compressible member 254 extends axially between divider 252 and second outer tube section 246 to provided conductivity between first outer tube section 244 and second outer tube section 246. At least one hole 255 is disposed through first outer tube section 244 to communicate the interior of outer fluid line 224 with reservoir 227.

Reservoir 227 also acts as an accumulator for fluid within outer fluid line 224 when fluid line assembly 220 is contracted relatively rapidly. The outer slip joint is also pressure balanced. As described above, an increase in fluid pressure within outer fluid line 224 and reservoir 227 will act to expand the volume of reservoir 227 creating a contracting force in fluid line assembly 220. Expansion forces within reservoir 227, and the corresponding contracting forces created in fluid line assembly 220, act to resist expansion of outer fluid line 224 due to the increase in fluid pressure.

Figure 4:
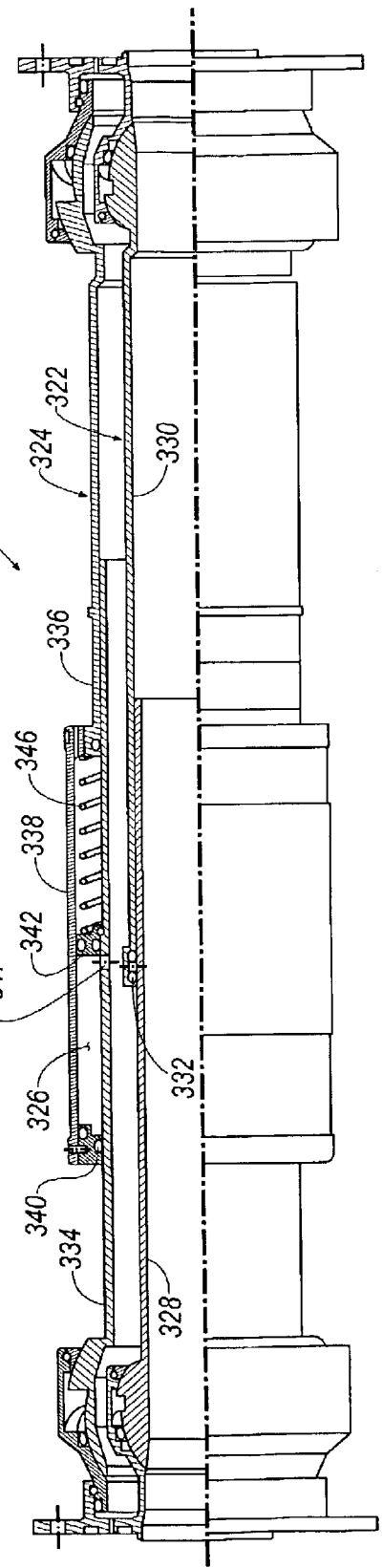

Referring to FIG. 4, another embodiment of the invention is shown. In this embodiment, a fluid line assembly 320 is disclosed that is substantially similar to fluid line assembly 20 with at least one exception, namely, only the outer fluid line or shroud 324 includes a slip joint a having pressure balanced reservoir 326.

As illustrated in FIG. 4, an inner fluid line 322 is provided that includes a first inner tube section 328 and a second inner tube section 330 configured to slide over first inner tube section 328. At least one annular sealing member 332, such as an o-ring, is disposed between first inner tube section 328 and second inner tube section 330 to inhibit fluid leakage therebetween.

Outer fluid line 324 includes a first outer tube section 334 and a second outer tube section 336. An outer slip joint section 338 is sealably joined on one end to second outer tube section 336 and is free to slide over first outer tube section 334 on the other end. At least one annular sealing member 340 is disposed between first outer tube section 334 and outer slip joint section 338 to inhibit fluid leakage therebetween. A divider 342, which is substantially similar to divider 105 described above, is secured to first outer tube section 334 and is provided between first outer tube section 334 and outer slip joint section 338 to help define reservoir 326. A resiliently compressible member 346 extends axially between divider 342 and second outer tube section 336 to provided conductivity between first outer tube section 334 and second outer tube section 336. At least one hole 347 is disposed through first outer tube section 334 to communicate the interior of shroud 324 with reservoir 326.

Reservoir 326 acts as an accumulator for fluid within outer fluid line 324 when fluid line assembly 320 is contracted. As described above, an increase in fluid pressure within outer fluid line 324 and reservoir 326 will act to expand the volume of reservoir 326 creating a contracting force in fluid line assembly 320. Expansion forces within reservoir 326, and the corresponding contracting forces created in fluid line assembly 320, act to resist expansion of outer fluid line 324 due to the increase in fluid pressure.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A fluid line assembly, comprising:
   an outer fluid line including first and second outer ball joint assemblies;
   an inner fluid line including first and second inner ball joint assemblies; and
   wherein the inner and outer fluid lines each include a slip joint, at least one of the slip joints including a reservoir in communication with the interior of the corresponding fluid line.

2. The fluid line assembly of claim 1, wherein the ball joint assemblies are disposed proximate first and second ends of the inner and outer fluid lines.

3. The fluid line assembly of claim 1, wherein the slip joint includes a tube section and a slip joint section.

4. The fluid line assembly of claim 3, wherein a sealing member is disposed between the tube section and the slip joint section.

5. The fluid line assembly of claim 3, further including a divider between the tube section and the slip joint section.

6. The fluid line assembly of claim 5, wherein the divider includes a pair of sealing members, each sealing member sealing against one of the tube section and the slip joint section.

7. The fluid line assembly of claim 3, wherein the tube section and slip joint section at least partially define the reservoir.

8. The fluid line assembly of claim 1, wherein at least one of the slip joints includes a resiliently compressible member.

9. The fluid line assembly of claim 8, wherein the resiliently compressible member is electrically conductive.

10. The fluid line assembly of claim 1, wherein a hole is disposed through the corresponding fluid line to provide an interior of the corresponding fluid line in communication with the reservoir.

11. The fluid line assembly of claim 1, wherein the reservoir is expandable to receive fluid from the corresponding fluid line as the fluid line assembly is contracted.

12. The fluid line assembly of claim 1, wherein the reservoir is contractible to expel fluid into the corresponding fluid line as the fluid line assembly is extended.

13. The fluid line assembly of claim 1, wherein the inner and outer fluid line assemblies each include a slip joint having a reservoir in communication with the interior of the corresponding fluid line.

14. The fluid line assembly of claim 1, wherein the fluid line assembly includes means for securing the fluid line assembly to a mating structure.

15. A fluid line assembly, comprising:
   an outer fluid line;
   an inner fluid line disposed entirely within the outer fluid line; and
   wherein the inner and outer fluid lines each include a ball joint assembly and a slip joint.

16. The fluid line assembly of claim 15, wherein the inner and outer fluid lines each include a pair of ball joint assemblies.

17. The fluid line assembly of claim 16, wherein the first and second fluid lines extend between their corresponding ball joint assemblies.

18. A fluid line assembly, comprising:
- an outer fluid line including first and second outer ball joint assemblies;
- an inner fluid line including first and second inner ball joint assemblies; and wherein the inner and outer fluid lines each include a slip joint, at least one of the slip joints including a reservoir sealingly enclosed between overlapping sections of the corresponding inner or outer fluid line, the reservoir being in communication with the interior of the corresponding fluid line.

* * * * *